June 30, 1953  A. WERTEPNY ET AL  2,643,584
METHOD FOR CUTTING TEETH IN PINKING SHEARS
Filed May 12, 1949  3 Sheets-Sheet 1
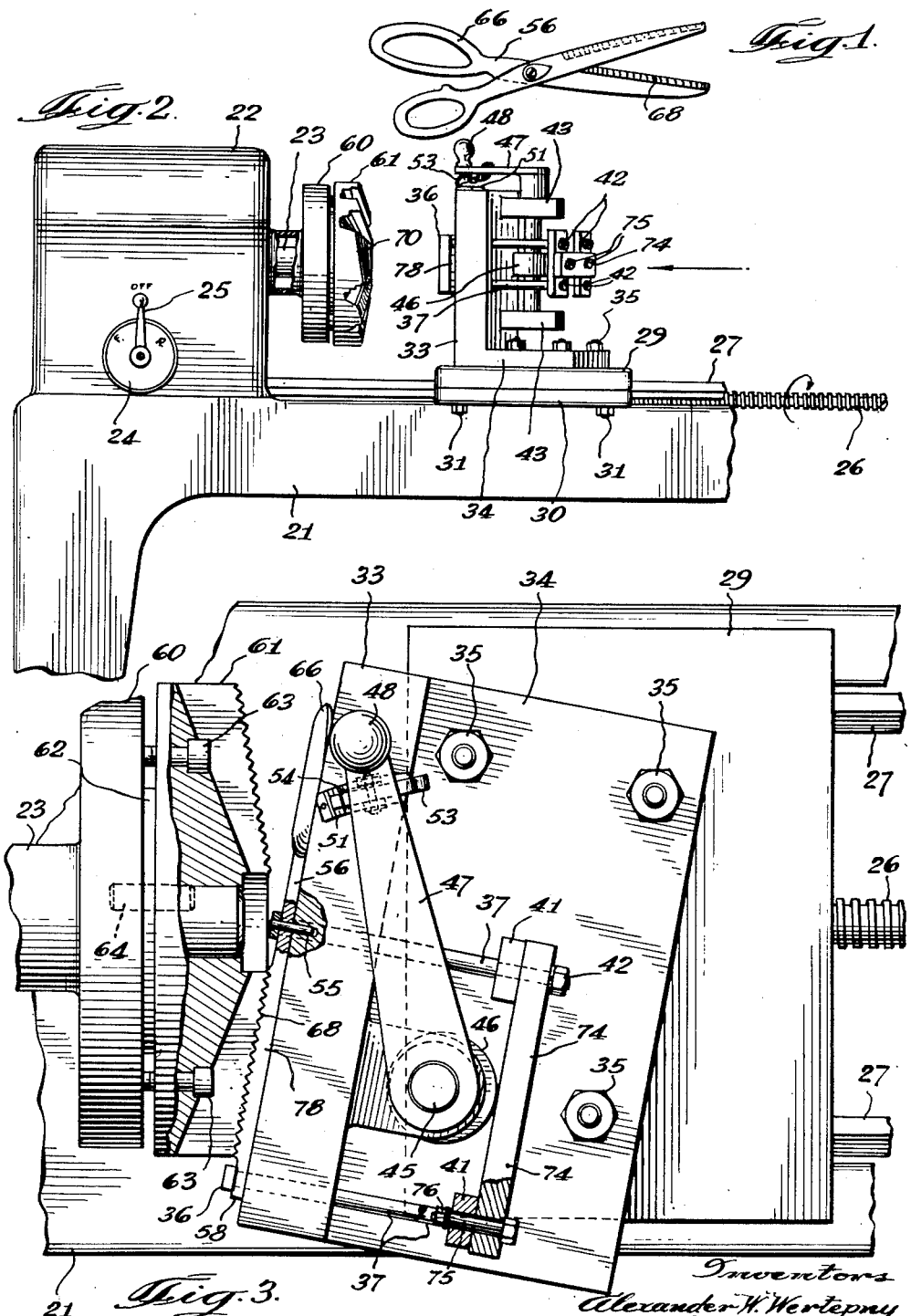
Inventors
Alexander W. Wertepny
Rudolph J. Wertepny
By John F. Bryna
Attorney

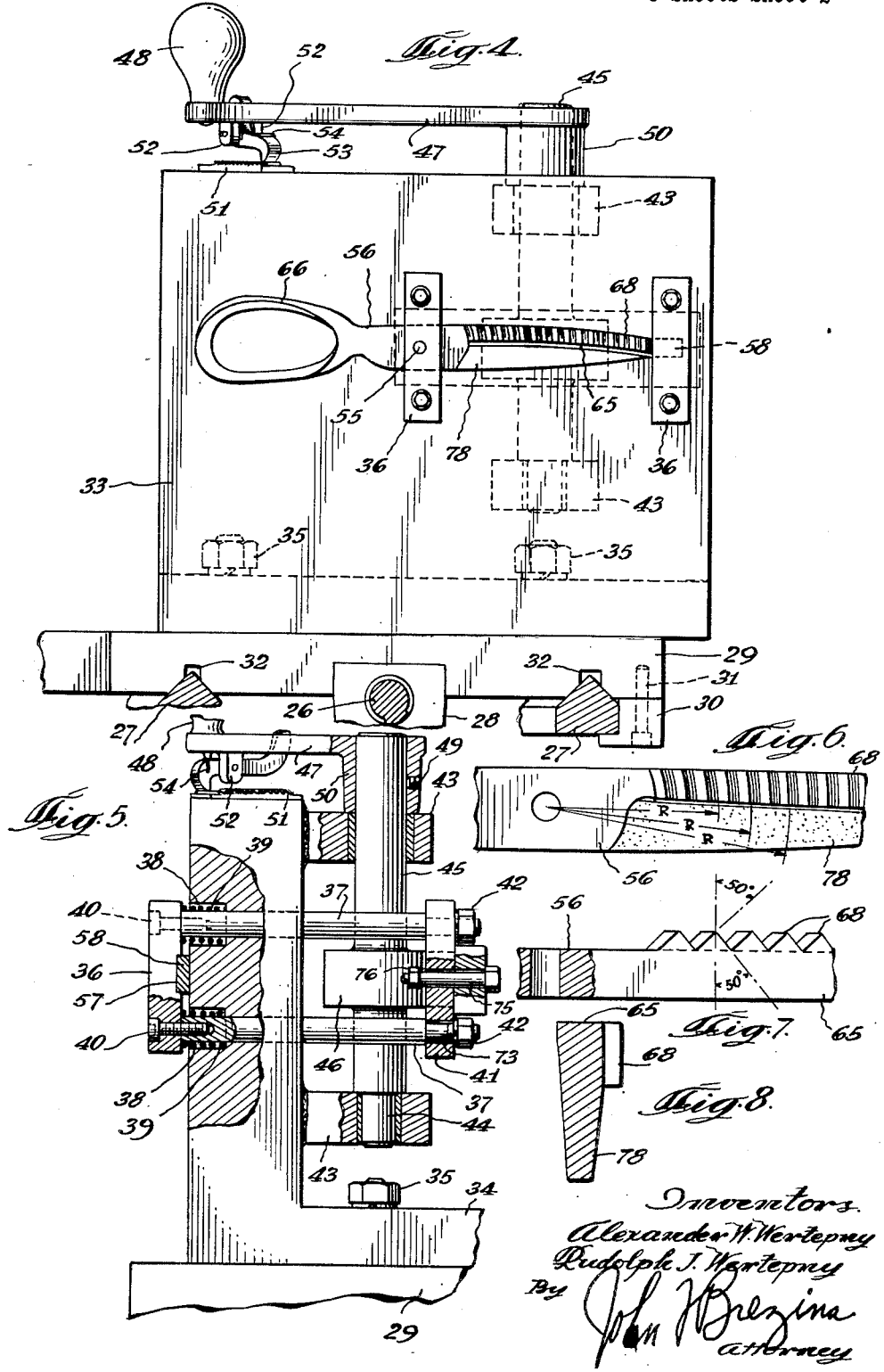

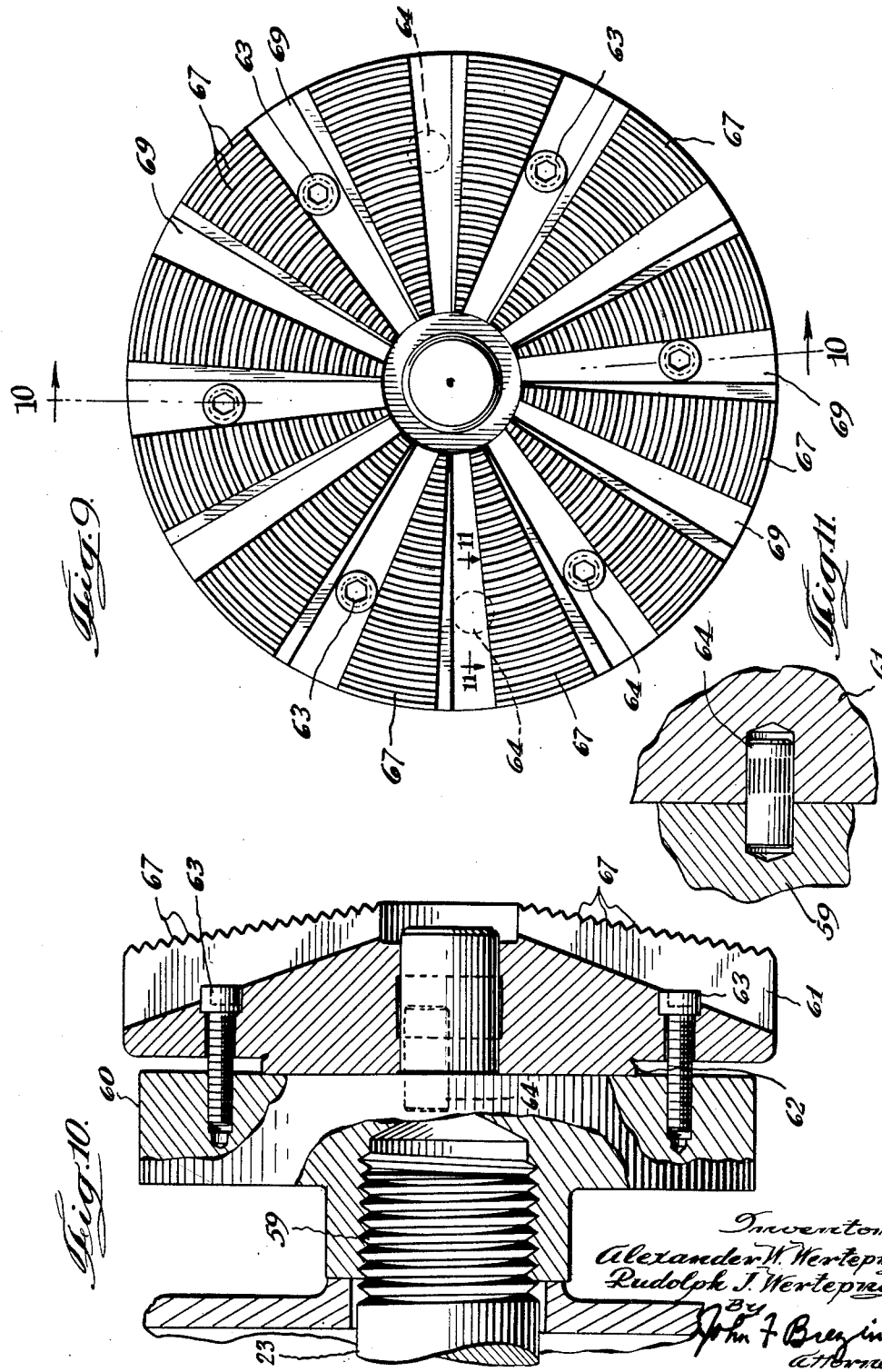

Patented June 30, 1953

2,643,584

UNITED STATES PATENT OFFICE 2,643,584

METHOD FOR CUTTING TEETH IN PINKING SHEARS

Alexander Wertepny and Rudolph J. Wertepny, Chicago, Ill., assignors of sixty per cent to Stanley A. Wertepny, Edward M. Wertepny, and Benjamin Luscalzo, all of Chicago, Ill.

Application May 12, 1949, Serial No. 92,926

4 Claims. (Cl. 90—11)

Our novel invention relates to a new method in the art of the manufacture of pinking shears and relates to a new and novel machine adapted to cut curved and arcuately faced teeth in the blades of a pinking shear, and embodying a novel device adapted to hold a blade blank in a predetermined position with relation to the pivotal axis of a cutting device, which cutting device will cut the ultimate arcuate teeth and arcuately surfaced teeth in pinking shear blades.

Prior to our invention, the cost of manufacture of pinking shears had been relatively great because no method or means had been devised or used whereby arcuately faced cutting teeth could be formed, cut or milled economically and rapidly and in a single operation. The most recent method which has been used, prior to our method could not produce the desired result satisfactorily and could not overcome one of the main difficulties encountered, namely that of having to bend the handle of the shears out of the path of the cutting means to enable the teeth to be cut. Additionally, in said most recent method, the problem of how to completely mill the teeth in a single operation was not solved, at least two separate cutting operations being required. It will be seen how, by our novel method and with our novel machine, a multiplicity of manual operations, previously required, are completely eliminated and dispensed with. Our invention overcomes the necessity of having to manually readjust the position of the blade blank while teeth are being cut or milled therein and it completely forms the ultimate arcuately faced concentric teeth in a single operation.

It is an object of our invention to provide a method in which but a single mounting of a blade blank is necessary in order to cut the ultimate cutting teeth in a pinking shear blade.

It is a further object of our invention to provide a novel method in which a shear blade blank, once mounted, may be advanced along a predetermined path toward a cutting tool so that the cutting tool will mill all the teeth, in the blade, simultaneously.

It is additionally an object of our invention to provide a novel mounting means for mounting the blade blank in the desired position with respect to the cutting tool so that, once mounted, no additional adjustment of the blade blank is necessary other than the advancement of said mounting means toward the cutting tool, the curved arcuate teeth being completely formed concentric with the ultimate axis of the shears before removal of the blade blank from the mounting means.

It is additionally an object of our invention to provide a novel machine having a milling cutter which comprises a plurality of elongated arcuate cutting teeth which are concentric to the axis of rotation of said device and which teeth define a frustro-conical surface of revolution and which cutting teeth are adapted to successively cut deeper and deeper arcuate recesses in a blade blank to thereby form concentric curved faces of the teeth in a blade of a pinking shears.

It is additionally an object of our invention to provide a novel method in which the flanged blade to be cut is mounted in a releasable clamping device with the ultimate pivotal axis of the blade positioned in perpendicular relation with respect to the aforesaid frusto-conical surface, and then advanced along a predetermined path toward said rotating cutter, said cutter having curved teeth therein, until all the required teeth are cut concentrically in the shear blade, each of said blades cut being adapted to cooperate with a similarly cut opposite blade to provide a pinking shears.

It is an object of our invention to provide a novel combination of elements in a cutter and mounting means for a blade blank which cooperate to perform our novel method.

Other and further objects of our invention will become apparent from the following description and appended claims, reference being made to the accompanying drawings and numerals of reference appearing thereon.

On the drawings:

Fig. 1 is an elevational view of the shears which is the completed product of my novel method.

Fig. 2 is a side elevation of portions of a supporting stand or base showing the cutting tool or milling cutter mounted in an operating position and showing the movable blank holding clamping device mounted in a position to move toward the cutting teeth of said cutter.

Fig. 3 is an enlarged top plan view showing the blade holding device at its ultimate point of advancement toward the cutting device and showing the teeth as cut and illustrating the step in my novel method immediately prior to withdrawal of the clamping and mounting plate and removal of the cut blank.

Fig. 4 is an elevational view of the face of the mounting plate of our clamping device after the teeth have been milled in a blade blank and showing the guide rails and central feed screw along which said carriage moves.

Fig. 5 is an enlarged view of the bracket-like clamping device, having parts broken away, and illustrating the means for gripping a blade blank.

Fig. 6 is an enlarged elevational view of one of the blades, parts being broken away and illustrating the relation of the cut teeth to the ultimate pivotal axis of the shears.

Fig. 7 is a fragmentary view of a cut blade flange and showing the cut teeth in elevation.

Fig. 8 is a vertical cross-sectional view taken on the line 8—8 of Fig. 7.

Fig. 9 is an elevational view looking at the front face of my novel tooth cutting device.

Fig. 10 is a cross-sectional view taken substantially on the line 10—10 of Fig. 9 and showing parts of the chuck plate and driving means broken away for the purpose of illustration.

Fig. 11 is a fragmentary view of the chuck plate and arbor and illustrating the driver pins.

Referring to Figs. 2 and 3 of the drawings, it will be seen that numeral 21 represents the base portion of a supporting stand or frame or other suitable support used to support the machine. Integral with base 21 there is a housing member or shell 22 which houses and envelops journalled driven shaft 23 and which is connected to a power driving means, not shown, through gear transmission means, not shown. On a face of the housing member 22 there is a scale 24 which is marked for "forward," "reverse" and "off" and an indicator and control arm 25 which is pivotable to any of the aforesaid markings to thereby appropriately cause the power driving mechanism of the machine to be selectively transmitted and controlled.

As illustrated in Figs. 2 and 3, numeral 26 represents an elongated driven screw or threaded guide shaft which is rotatably driven by a mechanism (not shown) of the lathe.

As illustrated in Figs. 2, 3 and 4, a pair of stationary parallel guide rails or tracks 27 are suitably mounted in spaced relation on opposite sides of the base 21, one being preferably on one side of the elongated screw 26, and the other rail 27 being on the other side of the elongated screw 26.

As illustrated in Fig. 4, an elongated apertured and internally threaded block 28 is threadingly mounted on the screw 26 and as said screw rotates, the block 28 is adapted to move either forward or backward depending on the rotation of said screw. A recessed plate or carriage 29 is keyed or otherwise secured on said apertured block 28, said plate 29 being adapted to be moved with said block as said block is moved longitudinally by the screw 26. The plate or carriage 29 is additionally maintained and guided in its positions on and along the rails 27 by means of elongated flanged mounting brackets 30, one of which is shown in Fig. 4, to which brackets said recessed plate 29 is releasably connected by a means such as bolts or screws 31, said brackets 30 preferably abutting respective rails 27 at the bottom and one side thereof respectively.

As illustrated in Fig. 4, numerals 32 represent a pair of elongated guide recesses in carriage 29 and into which portions of the guide rails 27 extend respectively, said plate 29 being adapted to be guided by the rails 27 as it moves and as will be described hereinafter.

As illustrated in Figs. 2, 3, 4 and 5, numeral 33 represents a wide and preferably thick upwardly extending mounting plate, standard or member preferably having a base flange 34 which extends at right angles from the plate 33. Said mounting member 33 is releasably mounted on the plate or carriage 29 by means such as screws or bolts 35 being threaded through the flange 34 and into slidable apertured plate 29.

As illustrated in Figs. 2, 4 and 5, numerals 36 designate a pair of preferably flat and elongated clamping brackets, straps or retaining members which are extensible and retractable with regard to the face of plate 33. Each of the straps 36 is connected to preferably two slidable pins or rods 37 at one end thereof, said pins 37 being threaded at the other ends thereof, said rods or pins being slidable in holes or apertures provided therefor in the plate 33. The plate 33 has a plurality of annular recesses 38, two of which are illustrated in Fig. 5, said recesses being enlarged end portions of the holes or apertures in which the pins 37 slide. Expansion springs 39 are seated in each of the recesses 38 respectively around the pins 37 and abut against adjacent portions of the normally rear portions of the mounting straps 36. One of the brackets 36 and its connected pins 37 and springs 39 is illustrated in Fig. 5. Each of the vertically extending brackets or metal retaining straps 36 is mounted on the ends of two of the pins 37 by means such as screws 40 which extend through straps 36 and are threaded into threaded apertures in pins 37 respectively.

At the opposite ends thereof the pins 37 are connected together by means of an apertured bar or tie 41. Said two spaced apart vertically extending ties 41 are loosely mounted by suitable screws on the reduced threaded end portions 73 of pins 37, as illustrated in the broken away portion at the right of Fig. 5.

As illustrated in Figs. 2, 3 and 5, numeral 74 designates an apertured link connector or cross bar which connects ties or bars 41. Numeral 75 represents bolts or screws which yieldably connect cross bar 74 to ties 41, bolts 75 being mounted in the ties 41 and being retained by nuts 76. It will be noted that apertures or holes 77 in cross bar 74 are larger than circumference of bolts or screws 75 and that said cross bar is thereby permitted to move and adjust itself within the limit of said holes and/or apertures, when mounted, to thereby equalize the pressure transmitted through said cross bar to the ties 41 and to straps 36.

As illustrated in Figs. 2 and 5, numeral 43 designates a pair of bearing blocks or bosses which are mounted in spaced superposed and aligned relationship on the back of plate 33 in any suitable manner. In the lowermost of the bearing blocks 43 the lower end 44 of vertically disposed shaft 45 is journalled. An upper portion of the shaft 45 is journalled in the uppermost of the bearing blocks 43. Rigidly mounted on shaft 45 is a cam or eccentric member 46, and said cam is aligned with the cross bar 74, so that as the cam is rotated it will slidably engage said connector bar 74. As the cam 46 engages and moves the bar 74 to clamping position, the rods 37 draw or pull the clamping straps 36 toward the face of the plate 33. When the cam 46 is rotated with its narrower part against said cross bar 74, the expansive spring action of springs 39 will cause the clamping straps 36 to be pushed away from the plate 33.

An apertured manually rotatable lever or crank 47 having a handle 48 is secured to the upper end of the shaft 45 and is held secured by means such as set screw 49, which set screw is threaded through the integral hub portion 50 of the lever or crank 47, said crank being adapted to be adjustably repositioned on the upper portion of the shaft 45.

As illustrated in Fig. 4, the lever 47 has a pair of normally depending ears or extensions 52 between which is pivotally mounted a pawl or dog 53. An expansion spring 54 connected to the plate 33 and to the pawl 53 normally holds the pawl in engagement with the teeth or serrations of the rack bar 51 which is preferably rigidly mounted on the top of the plate 33.

One of the clamping members or straps 36 carries an inwardly extending stud or lug 55 which is precision made and which extends perpendicular to the plane of such strap or clamping member 36. Said stud or pin 55, as illustrated in Fig. 3, is adapted to snugly fit within an aperture in the hub or shank 56 of the shear blank, said aperture being concentric with the pivotal axis of the ultimately formed pinking shears and being the means by which the connection of ultimate blades of the pinking shears is facilitated. The other of the mounting straps or clamping members 36 is provided with a recess 57 into which the outer integral extension 58, shown in Fig. 3 and in dotted lines in Fig. 4, of the blade blank is adapted to fit snugly. It will now be seen that the flanged blade blank 78, which is preferably cast, can be rigidly mounted in a predetermined position with the integral flange facing outwardly such as the one illustrated in Fig. 4, and that to mount said blade blank in the rigid position, it would only be necessary for an operator to turn the lever 47 counter-clockwise to blank clamping position and permit the pawl 53 to engage in the proper tooth of the ratchet 51 to lock the cam in position. After the tooth cutting operation is completed the operator need only press down on the end of the pawl 53 against the action of spring 54, turn the lever 47 in the direction to enable the clamping straps 36 to be projected because of action of springs 39, and then withdraw blade blank 78 from the device.

Referring to Figs. 2, 3, 9 and 10, numeral 23 designates a driven shaft which is connected to a power driven mechanism through a reducing gear transmission (not shown). Said shaft has a threaded end 59 which is illustrated in Fig. 10. A rotatable apertured hubbed plate, chuck or arbor plate 60 is preferably threadingly mounted on the threaded end portion 59 of shaft 23. Numeral 61 designates generally an annular cutting tool or milling cutter which preferably has an annular hub 62, which hub 62 has a precision formed end face which is adapted to abut against the flat end face of chuck plate 60. Said tool or cutter 61 is removably connected to arbor 60, preferably by means of threaded screws or bolts 63 which are adapted to mount the cutting tool 61 in a predetermined position with respect to the arbor 60.

As illustrated in Figs. 9, 10 and 11, we employ a pair of dowel pins, driver pins or lugs 64 which are snugly mounted in precision formed holes in arbor plate 60 in preferably diametrically opposite portions of the arbor plate 60 and in the milling cutter 61, said dowel pins 64 being adapted to absorb any shearing stresses during rotation of the arbor plate 60. The milling cutter 61 is centrally apertured and has an optional key-way adapted to receive a key (not shown).

It will be noted by referring to Figs. 2, 3 and 10 that one face of the cutter 61 is frustro-conical in shape, so that as the cutter 61 rotates to engage and cut the arcuate teeth 68 of shear blank flange 65 the handle or finger grip 66 is maintained in angular position spaced from the cutter and will not be cut by the cutting teeth 67 of milling cutter 61. In order that the teeth 68 of the blade blank may be properly cut the shear blank flange 65 must at all times be kept substantially parallel to an element of the conical surface of revolution of the apices of the cutting portions of teeth 67, and the blank 78 must be advanced into engagement with the cutting faces of the teeth 67 in proper alignment thereto, and this is accomplished by mounting base 34 and the flat-faced plate 33 at a proper angle on the carriage or mounting plate 29, so that the flat-faced plate 33 is parallel to an element of said surface, and by moving plate 33 perpendicular to the face thereof and thereby we mill teeth 68 uniformly and correctly in flange 65. It should be understood that the face of plate 33 is preferably flat and that the distance of the face of flange 65 from plate 33 is preferably uniform throughout the length of said flange.

Referring to Figs. 9 and 10, it will be noted that the bolts 63 extend through the milling cutter 61 and are countersunk in holes which extend from recesses 69 which radial recesses divide the groups or segments of cutting teeth 67. The provision of radial recesses or grooves 69 provides flutes or passages through which the cut away milled chips from the flange 65 will be discharged without impairing the operation of the milling cutter 61.

It will be understood that the cutting teeth 67 of cutter 61 are preferably arcuately faced and that they are spaced radially from the axis of rotation and that corresponding cutting edges of the radially disposed teeth are at the same cutting elevation or projection and are disposed in a conical surface of revolution.

As illustrated at 70, in Fig. 1, it is to be observed that in a preferable form of the novel cutting device the concentrically disposed teeth 67 (which are preferably concentric to the axis of rotation of the cutter 61), uniformly recede or slope away from the cutting edge at the rake of said teeth and by thusly sloping the teeth a longer life is given to the cutting tool and friction during the cutting operation is lessened. It should be understood that only the forward faces of the teeth in each segment are involved in the actual cutting and milling operation. The height or projection of the cutting portion of the teeth on all the segments is substantially the same so that as the cutter rotates the advancing flange blank 65, (which is carried on the face plate 33) will be successively milled and cut. By doing this as aforedescribed the teeth on the cutter 61 will wear away substantially equally and will always present uniform cutting surfaces and cutting surfaces of equal projection and rake. It will be understood that all the teeth will be cut of substantially uniform depth and be cut substantially at the same time as long as the flange 65 of the shear blank is progressed into engagement with the cutter 61 in substantial parallelism to a plane through the apices of the cutting portions of the cutting teeth 67. It is appreciated that by changing the position of the flange 65 or the path along which the plate 33 advances from that aforedescribed that equivalent variations in our method may be achieved.

It will be understood that the teeth 68 in the shear blank flange 65 will be arcuate and will have sloping arcuate surfaces and that the same in the form described herein will be concentric to the pivotal axis of the finished shears illustrated in Fig. 1.

The method we employ is undoubtedly one of the most unique innovations in this art which has ever been conceived, and it will be understood that by predetermining relationship between the flange 65 and the cutting tool 61 and by spacing arcuate teeth in a predetermined relationship, so that the same rotate about a given pivotal axis, ultimate and cooperating teeth of the shear blank may be cut in ultimate operating shape so that no additional cutting is necessary. We have thereby overcome one of the most costly operations which are priorly necessary in making pinking shears.

It should be understood, however, that we do not limit ourselves to a device for cutting arcuate teeth all of which are concentric to the pivotal axis, nor do we intend to limit ourselves to a method for cutting teeth all of which are concentric to the pivotal axis, it being obvious that the shape, form and relative positions of the teeth 67 on the milling cutter 61 may be varied as desired to provide cutting surfaces which would cut teeth in a shear blank or die of any desired curvature, shape or position.

The teeth of the opposite blanks are cut in the same manner. However, it should be understood that the positions of the teeth 67 on the cutter used for one of the blade blanks will be slightly different than the positions of the teeth on the cutter used for the other of the blades, because the teeth 68 in the respective blades of a shear must interdigitate in the finished shears.

After the teeth 68 have been cut as described the opposite blades are connected by a secured pivot to then pivot in a usual manner and the shears are polished.

As many changes could be made in the above construction, and as many apparently widely different embodiments of our invention within the scope of the claims could be constructed without departing from the spirit and scope thereof, it is intended that all matter contained in the accompanying specification shall be interpreted as illustrative and not in a limiting sense.

We claim:

1. In a method for cutting teeth in a pinking shear blade, the steps of rotating a teeth-bearing milling cutter so that the cutting face thereof moves thru a frusto-conical path, advancing a releasably mounted shear blade blank toward the cutter along a path so that the ultimate pivotal axis of the blank intersects the axis of rotation of said milling cutter, and gradually cutting arcuately surfaced teeth in said blank with the arcuately faced teeth of the milling cutter.

2. In a method for cutting arcuately faced teeth in a pinking shear blade, the steps of releasably clamping a blade blank in a mounting device so that the ultimate pivotal axis of the blade is non-parallel to the axis of a cutter; rotating the face of said cutter in a frusto-conical path; advancing the blade blank into progressive engagement with the arcuately faced teeth of said cutter and along a path which is transverse to said frusto-conical path until arcuately faced teeth are cut in the blank of the desired depth.

3. In a method of cutting teeth in a pinking shear blade with a rotary cutter whose teeth move in a conical path, the steps of mounting the blade so that it extends parallel to an element of said path, with the ultimate pivot axis of the blade intersecting the axis of said path substantially at the apex of said path during the cutting operation, and progessively advancing the blade in engagement with the cutter teeth.

4. In a method of making teeth in a pinking shear blade blank, the steps of rotating a series of cutting teeth in a conical path with the teeth progressively spaced from the apex and axis of said path, supporting a pinking shear blade blank so that it extends parallel to an element of said path and intersects the axis of said path, and effecting progressive engagement of the blank with the cutting teeth until the cutting teeth have cut complementary teeth in the blank.

ALEX WERTEPNY.
RUDOLPH J. WERTEPNY.

References Cited in the file of this patent

UNITED STATES PATENTS

| Number | Name | Date |
|---|---|---|
| 1,252,679 | Fellows | Jan. 8, 1918 |
| 1,384,328 | Middledorf | July 12, 1921 |
| 1,553,885 | Watrous | Sept. 15, 1925 |
| 1,646,988 | Berthon | Oct. 25, 1927 |
| 1,959,190 | Wyner et al. | May 15, 1934 |
| 2,148,479 | Kraus | Feb. 28, 1939 |
| 2,268,714 | McCarthy | Jan. 6, 1942 |
| 2,286,874 | Schwartz | June 16, 1942 |
| 2,289,155 | Weidauer | July 7, 1942 |
| 2,317,262 | Dusevoir | Apr. 20, 1943 |
| 2,327,944 | Toubhans | Aug. 24, 1943 |
| 2,353,096 | Weidauer | July 4, 1944 |